Sept. 12, 1933.  F. GEIGER  1,926,526
CHART DISPLAY APPARATUS
Filed Jan. 23, 1932  3 Sheets-Sheet 1
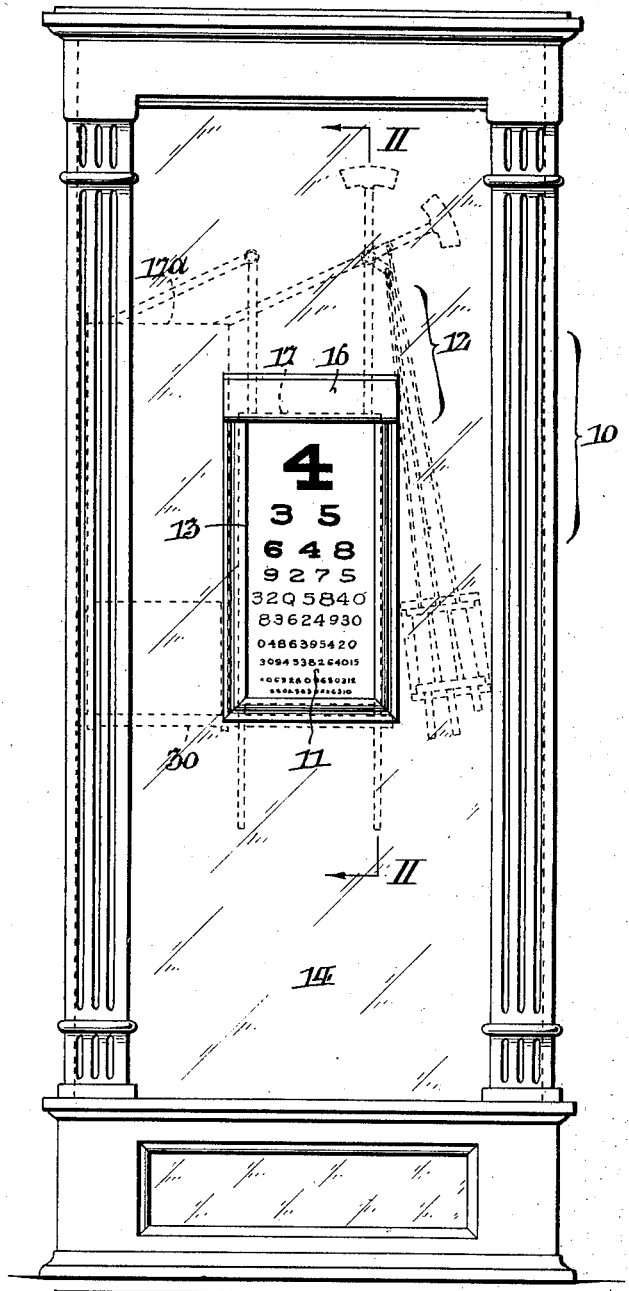
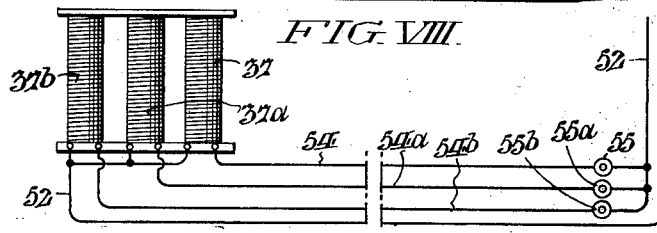
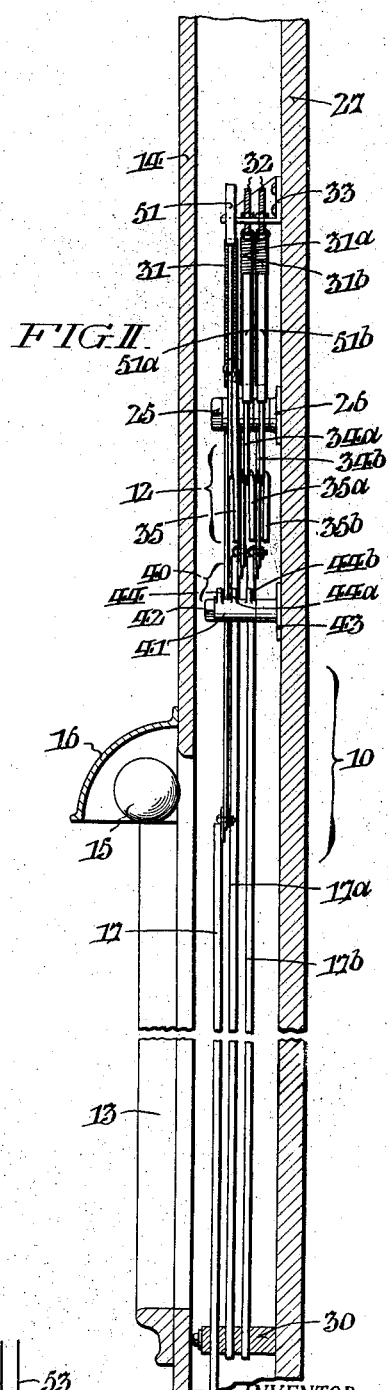
INVENTOR:
Frederick Geiger;
BY Fraley Paul
ATTORNEYS.

Sept. 12, 1933.    F. GEIGER    1,926,526
CHART DISPLAY APPARATUS
Filed Jan. 23, 1932    3 Sheets-Sheet 2
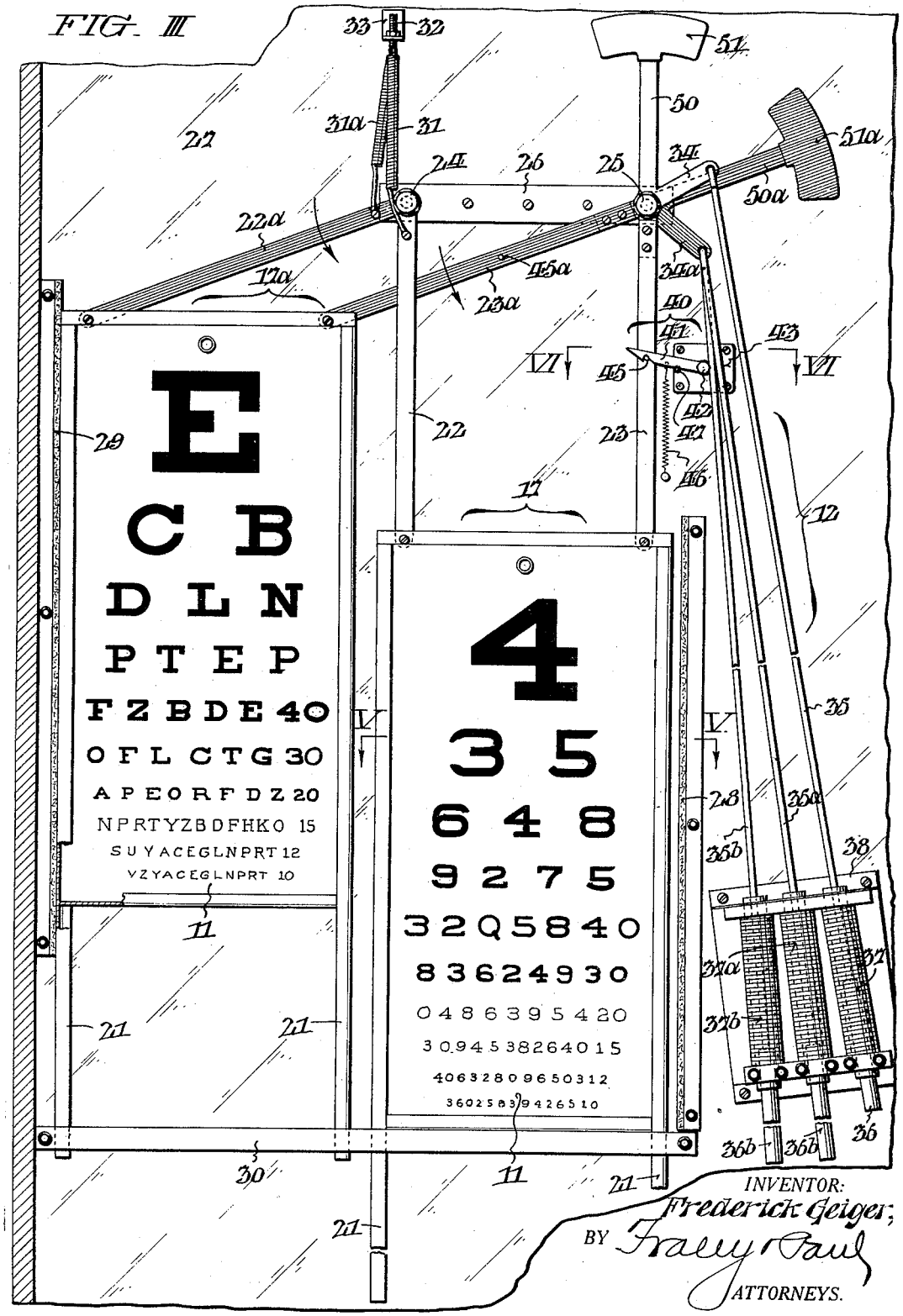
INVENTOR:
Frederick Geiger;
BY Fraley Paul
ATTORNEYS.

Sept. 12, 1933.  F. GEIGER  1,926,526
CHART DISPLAY APPARATUS
Filed Jan. 23, 1932  3 Sheets-Sheet 3
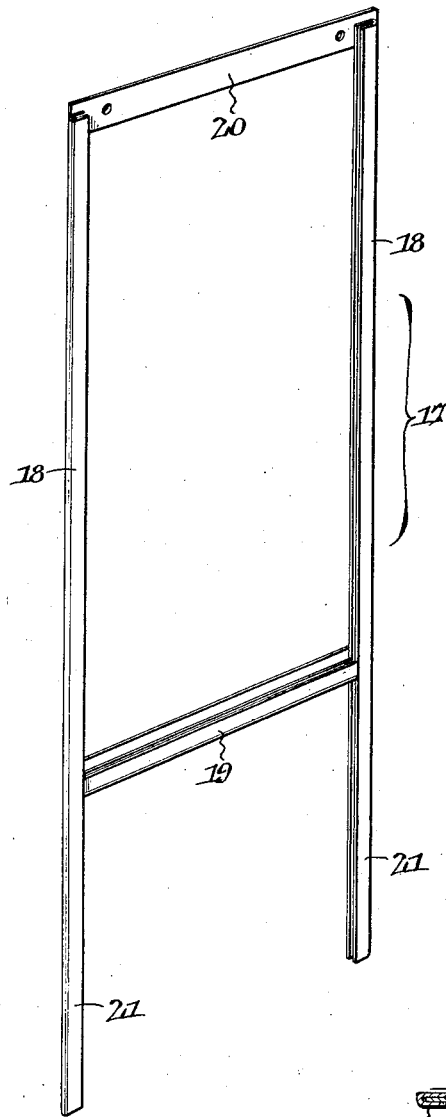
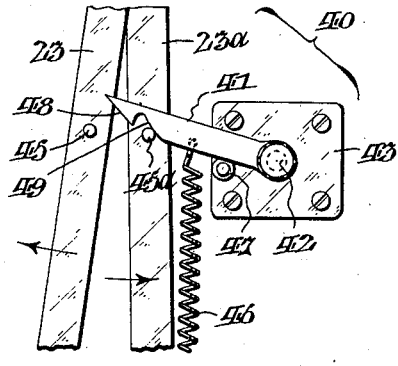
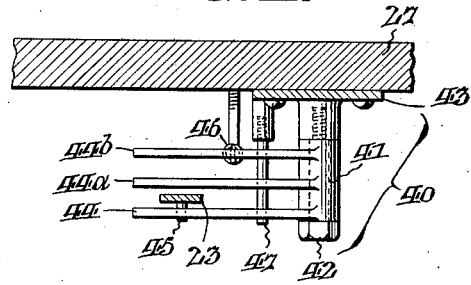
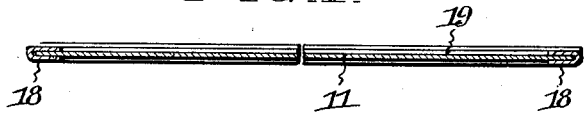

Patented Sept. 12, 1933

1,926,526

UNITED STATES PATENT OFFICE 1,926,526

CHART DISPLAY APPARATUS

Frederick Geiger, Drexel Hill, Pa., assignor to Wall & Ochs, Philadelphia, Pa., a corporation of Pennsylvania Application January 23, 1932. Serial No. 588,256

12 Claims. (Cl. 40—52)

This invention relates to apparatus useful for example to oculists in displaying reading charts incident to testing the eyesight of patients for distance.

In connection with apparatus of the kind referred to, it is an object of my invention to provide simple and reliable mechanism whereby individual reading charts may be selected from a group normally concealed within a protective housing for individual exhibition at a display opening or window at the front of such housing.

A further object of my invention is to embody with selecting mechanism such as aforesaid, a cancelling means operative, as a new chart is presented for display, the chart previously displayed is automatically withdrawn from exhibition.

Another object of my invention is to provide in association with selective mechanism having the above recited attributes, electric means whereby the apparatus may be remotely controlled so that the oculist making the sight test may rapidly effect interchanges of the charts at a distance from the apparatus without inconvenience to himself or distraction of the patient undergoing the test.

Still other objects and attendant advantages of this invention will be manifest from the detailed description following of the attached drawings, wherein Fig. I shows the front elevation of a chart display apparatus conveniently embodying the present improvements.

Fig. II is a partial vertical sectional view of the apparatus taken as indicated by the arrows II—II in Figs. I and III.

Fig. III is a fragmentary view of the apparatus with the front wall of its casing removed to show the actuating mechanism for the charts.

Fig. IV is a perspective view of one of the chart holders embodied in the apparatus.

Fig. V is a cross sectional view of one of the card holders taken as indicated by the arrows V—V in Fig. III.

Fig. VI is a detail sectional view taken as indicated by the arrows VI—VI in Fig. III showing the cancelling means hereinbefore mentioned.

Fig. VII is a fragmentary view in elevation showing the manner of operation of the cancelling means; and Fig. VIII is a diagram showing the electric connections of the apparatus.

Referring more in detail to these illustrations, my improved chart display apparatus comprises a housing 10 which encloses a multiplicity of charts 11 (of which there are three in the present instance), together with actuating mechanism 12 for moving the individual charts from a normal location of concealment at one side of the casing, to a display opening 13 in the front wall 14 of said casing. As delineated in Fig. I, the casing 10 is of an upright type adapted to be supported on the floor, backed against a room wall; and it may be suitably ornamented, after the manner suggested in the illustration, to harmonize with the decorations and furnishings of the room in which the apparatus is to be used. An electric light 15 (Fig. II) within a reflector visor 16 at the top of the opening 13 in the front of the housing 10, serves to illuminate the charts 11 as they are successively exhibited at the said opening.

From Figs. II and III it will be noted that there are individual holders 17, 17a and 17b provided for the three charts 11, each such holder being made, as exemplified in Fig. IV, from sheet metal, with channel-section side verticals 18, a bottom horizontal 19 also of channel section, and a flat section top horizontal 20, the side verticals 18 being extended downwardly at the bottom of the holder with provision of pendant projections 21 for a purpose later on explained. By virtue of the described construction, it is evident that the individual charts 11 can be readily withdrawn upward from the holders 17, 17a and 17b and replaced by others, or interchanged between the holders, as may be desirable from time to time.

It will be further observed from Figs. II and III, that the actuating mechanism 12 comprises triads of parallel arms 22, 22a, (the third being obscured in the drawings), and 23, 23a, and 23b from the outer ends of the respective pairs of which the chart holders 17, 17a and 17b are pivotally suspended, the said groups of arms being fulcrumed on separate pivot bolts 24, 25 let, at spaced points, into a horizontal bracket 26 secured to the back of the wall 27 of the housing 10. The parallel relation of the arms 22, 22a, etc., and 23, 23a, 23b obviously insures maintenance of the corresponding chart holders 17, 17a, 17b always in true upright position incident to their being swung downward (as indicated by the arrows in Fig. III) from the position of concealment at the left hand side of the housing 10, to display position at the opening 13. The movement of the chart holders 17, 17a, 17b is limited in one direction by a felted buffer strip 28 fastened by screws to the back wall 27 of the housing 10, and in the other direction by a similar felted buffer stop strip 29 likewise attached to said back wall. Incident to swinging, the chart holders 17, 17a and 17b are maintained in definite separation as a consequence of the engagement of their pendant extensions 21 in individual slots of a horizontal guide 30 affixed to the back wall 27 of the casing immediately below the level of the frontal display opening 13. Springs 31, 31a and 31b yieldingly keep the card holders 17, 17a and 17b normally in retracted position with their left hand side edges in engagement with the buffer strip 29, the said springs having their lower ends attached to the supporting arms 22, 22a, etc., and their upper ends connected to individual screw bolts 32 which are adjustable in a fixed bracket 33 for regulation of the spring tension.

Respectively connected to angularly-disposed shorter extremities 34, 34a and 34b of the arms 23, 23a and 23b reaching beyond the fulcrum center 25 in the opposite direction, are vertical thrust rods 35, 35a and 35b. At their lower ends, these thrust rods 35, 35a and 35b carry the armatures 36, 36a and 36b of individually associated solenoids 37, 37a and 37b which are supported by a fixed bracket 38 on the back wall 27 of the casing 10. Thus, as the solenoids 37, 37a and 37b are energized, an upward thrust is imparted to the corresponding rods 35, 35a and 35b, which movement is communicated to the arms 23, 23a and 23b, with attendant swinging of the chart holders 17, 17a and 17b from the location of concealment to the display position at the opening 13 as already explained.

In the use of the apparatus, it is intended that but one of the charts 11 be displayed at a time. Accordingly, I have devised a cancelling means 40 (Figs. II, III, VI and VII) which is automatically operated as one chart holder is brought into display position to release the holder of a previously exhibited chart for restoration, under the action of its spring 31, 31a or 31b (as the case may be) to the concealed position. This cancelling means 40 includes a latch member 41 which is pivoted at 42 on another bracket 43 secured to the back wall 27 of the housing 10. As shown in Fig. VI, the latch member 41 is formed with hook fingers 44, 44a and 44b having notches adapted to engage lateral studs 45, 45a, etc., on the chart supporting arms 23, 23a and 23b. A pull spring 46 tends to draw the latch member 41 against a fixed stop pin 47 on the pivot bracket 43. Incident to downward swinging say of the chart holders 17a, the stud 45a on the corresponding supporting arm 23a engages the inclined end 48 (see Fig. VII) of the finger 44a of the latch member 41 with the result that the said latch member is lifted against the action of its spring 43. Now, as a consequence of slight excess movement of the chart holder 16 at this time (permitted by pre-allocation of the buffer strip 28, as shown in Fig. III), the pin 45a on the arm 23a of the chart 17a which is being brought into display position cooperates with a cam slope 49 rearward of the notch in the corresponding finger 44a of the latch member 41, so that the said latch member is again lifted—this time high enough (as illustrated in Fig. VIII) to positively clear the pin 45 of the supporting arm 23 of the chart 17 previously exhibited at the display opening 13. Immediately upon such release of the holder 17 of the previously displayed chart, the stud 45a of the newly advanced chart holder 17a, is arrested by the notch in the finger 44 of the latch member 41, and thus locked while the released chart holder 17 continues in its upward travel under the pull of the spring 31 until it encounters the buffer stop strip 29.

To better insure the aforedescribed action of the cancelling means 40, I provide the prolongations 50, 50a and 50b of the chart holder supporting arms 23, 23a and 23b, respectively, with counterweights 51, 51a and 51b. As will be manifest from Fig. III, these counterweights are effective by their momentum at the time of the maximum speed of the arms 23, 23a and 23b, as they move over the fulcrum center 25 and when the springs 31, 31a and 31b are aligned substantially with the pivot center 24 and offer a minimum pull, to insure movement of the chart holders momentarily past the center of the display opening 13 as required for positive action of the cancelling means.

The electric circuit for controlling the apparatus may be as illustrated in Fig. VIII, wherein the numerals 52 and 53 indicate supply conductors extending from a suitable source of electric current, not shown. The solenoids 37, 37a and 37b are connected in parallel across the current supply conductors 52, 53 and interposed in the leads 54, 54a and 54b to one of the terminals of the said solenoids, are push buttons 55, 55a and 55b. Thus by pressing the proper push button, the corresponding solenoid will be energized with presentation, in turn, of the chart in the corresponding holder at the display opening 13, and concurrent release of the holder of the previously displayed chart in the manner already understood. In practise, the push buttons 55, 55a and 55b may be located at any distance from the display apparatus, and they therefore constitute a means of remote control.

When the apparatus is to be used in making tests for vision, the charts 11 may have inscribed upon them numbers of different sizes as illustrated, and the push buttons 55, 55a and 55b placed at a point within convenient reach of the optometrist, which may, for example, be at a distance of twenty feet. The mechanism 12 responds instantaneously to electrical actuation; so that interchange of the charts at the display opening 13 of the housing 10 is quickly and noiselessly accomplished, without distracting either the patient or the oculist.

My invention is of course not to be considered as limited to the specific use herein described for the convenience of illustration, since it may be readily embodied in suitable forms for advertising, signalling and for other purposes. I also consider myself free to vary the number of chart holders and the associated actuating instrumentalities in accordance with the dictates or exigencies of practise, and, in short to make any other changes and modifications comprehended within the scope of the appended claims.

Having thus described my invention, I claim:

1. In chart display apparatus, a housing; a multiplicity of charts within the housing; means independently fulcrumed on a common axis to support the individual charts for swinging movement always in upright position; and means whereby the charts may be selectively swung from a normal location of concealment in the housing to a display opening at the front of said housing.

2. In chart display apparatus, a housing; a multiplicity of charts within the housing; individual arms independently fulcrumed on a common axis to pivotally support the charts for swinging movement always in upright position; and means enabling selection between the charts and for actuating the arms to swing selected charts from a normal location of concealment in the housing to a display opening at the front of said housing.

3. In chart display apparatus, a housing; a multiplicity of charts within the housing; pairs of coaxially fulcrumed parallel arms each common to and pivotally supporting the charts individually for swinging movement always in upright position; and means enabling selection between the charts and for actuating the supporting arms to swing selected charts from a normal location of concealment in the housing to a display opening at the front of said housing.

4. In chart display apparatus, a housing; a multiplicity of charts within the housing; individual arms supporting the charts for swinging movement while maintaining them always in upright position; springs influencing the arms to normally hold the charts in a position of concealment within the housing; and means enabling selection between the charts, and for actuating the arms in opposition to the springs to swing selected charts from the normal location of concealment to a display opening at the front of the housing.

5. In chart display appartus, a housing; a multiplicity of charts concealed within the housing; means fulcrumed independently on a common axis to support the individual charts for movement always in upright position; means remote from the housing enabling selection between the charts; and means controlled by the selecting means for actuating the chart supporting means to move selected charts from a normal location of concealment within the housing to a display opening at the front of said housing.

6. In chart display apparatus, a housing; a multiplicity of charts within the housing; separate holders for the charts; separate arms by which the holders are pivotally supported always in upright position; means for selectively actuating the arms to swing the corresponding charts from a normal location of concealment in the housing to a display opening at the front of said housing; and a slotted guide engaging projections of the holders to keep them definitely separated and to stabilize them incident to movement as aforesaid.

7. In chart display apparatus, a housing; a multiplicity of charts within the housing; mechanism whereby the charts may be selectively moved from a normal position of concealment within the housing to a display opening at the front of said housing; means for locking the charts in display position; and means for automatically actuating the locking means when a new chart is brought into display position to release the chart previously displayed.

8. In chart display apparatus, a housing; a multiplicity of charts within the housing; separate counterweighted arms pivotally supporting the individual charts; springs operative upon the arms to keep the charts in a normal position of concealment within the housing; separate selective means for actuating the arms in opposition to their counterweights to swing the corresponding charts from the normal position of concealment to a display opening at the front of the housing; and cancelling means including a pivoted latch hook for engaging studs on the supporting arms of the charts to lock them in display position, the said hook having a cam incline inward of its notch, whereby, as a new chart is given slight excess movement under the momentum of its counterweight incident to being brought into display position, the holder of the prevously displayed chart is released to the action of its spring and returned to the normal position of concealment.

9. In chart display apparatus, a housing; a multiplicity of charts within the housing; separate arms pivotally supporting the charts upright; springs influential upon the arms to normally maintain the charts in a position of concealment within the housing; thrust rods connected to the arms; individual solenoids directly operative upon the thrust rods in opposition to the spring resistance to move the charts from the normal position to a display opening at the front of the housing; and an electric circuit with remote control means enabling selection between the solenoids.

10. In chart display apparatus, a housing; a multiplicity of holders within the housing supporting as many charts with capacity for removal and interchange; means fulcrumed on a common axis to sustain the chart holders for swinging movement always in upright position; and means whereby the holders may be selectively swung to move the charts from a normal location of concealment in the housing to a display opening at the front of said housing.

11. In chart display apparatus, a housing; a multiplicity of charts within the housing; means independently fulcrumed on a common axis to support the individual charts for swinging movement always in upright position; actuating means for individually swinging the charts from a normal location of concealment in the housing to a display opening at the front of said housing; and means whereby the actuating means for the individual charts may be selectively controlled at a point remote from the housing.

12. In chart display apparatus, a housing; a multiplicity of charts within the housing; means independently fulcrumed on a common axis to support the individual charts for swinging movement always in upright position; actuating means for individually swinging the charts from a normal location of concealment in the housing to a display opening at the front of said housing; and electric means whereby the actuating means for the individual charts may be selectively controlled at a point remote from the housing.

FREDERICK GEIGER.